United States Patent [19]

Firdaus

[11] Patent Number: 5,799,365
[45] Date of Patent: Sep. 1, 1998

[54] ADJUSTABLE NOZZLE FOR CHIPPER-SHREDDER VACUUM

[75] Inventor: Usman Firdaus, Strongsville, Ohio

[73] Assignee: MTD Products Inc., Cleveland, Ohio

[21] Appl. No.: 708,371

[22] Filed: Sep. 5, 1996

[51] Int. Cl.$^6$ ........................................... A47L 9/02
[52] U.S. Cl. ...................... 15/418; 15/422.1; 241/101.78
[58] Field of Search ........................... 15/415.1, 418, 15/422.1, 340.2; 56/DIG. 8; 134/21; 241/47, 101.78

[56] References Cited

U.S. PATENT DOCUMENTS

| | | | |
|---|---|---|---|
| 3,089,178 | 5/1963 | Sherman | 15/418 |
| 3,112,511 | 12/1963 | Lankenau | 15/415.1 |
| 3,491,399 | 1/1970 | Dolan et al. | 15/418 |
| 3,862,469 | 1/1975 | Burgoon | 15/418 |
| 5,231,827 | 8/1993 | Connolly et al. | 56/DIG. 8 |

FOREIGN PATENT DOCUMENTS 621170  1/1981  Switzerland ............ 15/418

*Primary Examiner*—Terrence Till
*Attorney, Agent, or Firm*—Emerson & Associates; Roger D. Emerson; Timothy D. Bennett

[57] ABSTRACT

An adjustable nozzle for use with a chipper-shredder vacuum for vacuuming debris from an outdoor surface is disclosed. The nozzle has an inlet for directing debris into the nozzle. The inlet has a first side, a middle section, a second side, and a non-inlet area. The first side has a first nozzle inlet, the middle section has a middle nozzle inlet, the second side has a second nozzle inlet. The cross-sectional areas of the first and second nozzle inlets are greater than the cross-sectional area of the middle nozzle inlet to equalize vacuum force throughout the nozzle. The nozzle further includes a nozzle extension that extends below the nozzle and an adjustment apparatus for adjusting the height of the nozzle extension from the ground to conform the chipper-shredder vacuum to the terrain. The nozzle extension may be raised for bumpy or thick terrain or lowered for a flat terrain.

9 Claims, 5 Drawing Sheets

5,799,365

ADJUSTABLE NOZZLE FOR CHIPPER-SHREDDER VACUUM

BACKGROUND OF THE INVENTION

1. Field of Invention

This invention pertains to the art of methods and apparatuses for chipping, shredding, and bagging lawn debris, and more specifically to methods and apparatuses for improving the intake of lawn debris into a chipper-shredder vacuum.

2. Description of the Related Art

In the past, chipper-shredder vacuums had a single-piece nozzle for vacuuming lawn debris. The height of the single-pieced nozzle from the ground could not be adjusted to conform to different terrains. The inability to conform the height of the nozzle to the terrain made the chipper-shredder vacuum less efficient on flat surfaces, such as sidewalks and driveways. The nozzle had to be high enough to cover bumpy terrain, and on a flat surface, the high clearance allowed air to enter the nozzle and decrease the power of the vacuum. On the other hand, if the nozzle was set too low, the chipper-shredder vacuum becomes less maneuverable over bumpy terrain because the nozzle would sometimes come into contact with undulations in the ground surface.

The single-pieced nozzle also had a symmetrically and uniformly shaped intake area that was rectangular with rounded corners. The force of the vacuum was greater in the middle of the nozzle that at the edges because of the wall effects and losses due to the incoming air contacting the nozzle walls. This uneven vacuum force within the nozzle could lead to an uneven vacuuming of debris from the lawn.

Applicant recognized the need to make the nozzle adjustable to cover different types of terrain and to adjust the shape of the nozzle intake to equalize vacuum pressure throughout the nozzle.

The present invention contemplates a new and improved adjustable nozzle for use with a chipper-shredder vacuum which is simple in design, effective in use, and overcomes the foregoing difficulties and others while providing better and more advantageous overall results.

SUMMARY OF THE INVENTION

In accordance with the present invention, a new and improved adjustable nozzle for use with a chipper-shredder vacuum is provided which is adjustable for both bumpy and flat terrain and provides an equalized vacuum throughout the entire nozzle intake area.

More particularly, in accordance with the present invention, a chipper-shredder vacuum for vacuuming debris from an outdoor surface is disclosed that has a nozzle, an impeller assembly, and a bag. The nozzle includes an inlet for directing debris into the nozzle. The inlet has a first side, a middle section, a second side, and a non-inlet area. The first side has a first nozzle inlet, the middle section has a middle nozzle inlet, and the second side has a second nozzle inlet. The first nozzle inlet, the middle nozzle inlet, and the second nozzle inlet each have a cross-sectional area, the cross-sectional area of the first nozzle inlet being greater than the cross-sectional area of the middle nozzle inlet, and the cross-sectional area of the second nozzle inlet being greater than the cross-sectional area of the middle nozzle inlet. The nozzle also has an outlet. The outlet is connected to the impeller assembly.

According to one aspect of the present invention, a chipper-shredder vacuum for vacuuming debris from an outdoor surface has a nozzle, an impeller assembly, and a bag. The nozzle includes a nozzle extension extending below the nozzle. The nozzle extension is displaced a height from the outdoor surface, the nozzle also has an adjustment apparatus for adjusting the height of the nozzle extension from the outdoor surface.

According to another aspect of the invention, a nozzle inlet for use with a vacuum assembly is disclosed. The nozzle inlet includes a first side. The first side has a first nozzle inlet. The first nozzle inlet has a cross-sectional area. The nozzle also includes a second side. The second side has a second nozzle inlet. The second nozzle inlet has a cross-sectional area. The nozzle further includes a middle section located between the first side and the second side. The middle section has a middle nozzle inlet. The middle nozzle inlet has a cross-sectional area. The cross-sectional area of the first nozzle inlet is greater than the cross-sectional area of the middle nozzle inlet. The cross-sectional area of the second nozzle inlet is greater than the cross-sectional area of the middle nozzle inlet.

According to another aspect of the present invention, a method of vacuuming lawn debris from a ground surface using a chipper-shredder vacuum is disclosed. The chipper-shredder vacuum includes a nozzle, a nozzle extension that extends a distance above the ground surface, an impeller assembly, and a bag. The method includes the steps of adjusting the distance of the nozzle extension above the ground surface using an adjustment apparatus to conform with the ground surface, and vacuuming the lawn debris with the chipper-shredder vacuum.

One advantage of the present invention is that the height of the nozzle extension of the chipper-shredder vacuum may be raised or lowered to conform to the needs of the terrain.

Another advantage of the present invention is that the vacuum created in the nozzle is of uniform force throughout the nozzle.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and herein.

DESCRIPTION OF THE PREFERRED EMBODIMENT

Figure 1:
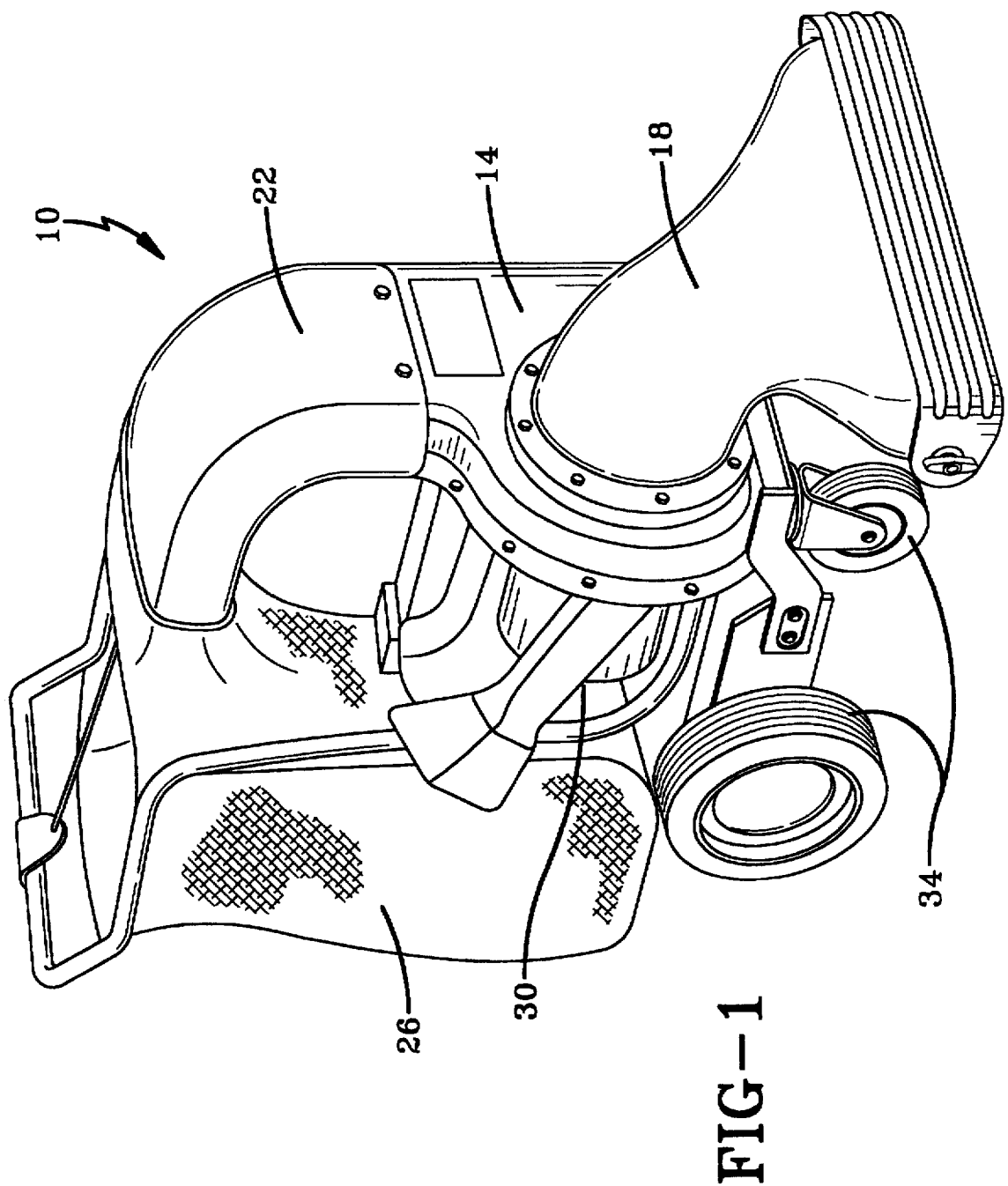
FIG. 1 is a perspective view of a chipper-shredder vacuum.

Referring now to the drawings wherein the showings are for purposes of illustrating a preferred embodiment of the invention only and not for purposes of limiting the same, FIG. 1 shows a perspective view of a chipper-shredder vacuum 10 of the type typically used to chip, shred, and bag lawn debris such as leaves, twigs, and hedge clippings. The chipper-shredder vacuum 10 uses an impeller assembly 14 to create a vacuum powerful enough to pick up lawn debris. The impeller assembly 14 includes fan blades (not shown) to create the vacuum and chipper knives (not shown) to chip and shred the lawn debris. A nozzle 18 extends from the impeller assembly 14 to the ground. The vacuum is created in the nozzle 18 by action of the impeller assembly 14, thereby facilitating the pick-up of lawn debris. After lawn debris is chipped and shredded by the impeller assembly 14, the debris is blown through outlet 22 preferably into bag 26. The chipper-shredder vacuum 10 is operated by any suitable power source, such as an engine 30. The chipper-shredder vacuum 10 is preferably mounted on a number of wheels 34 to enable an operator to push the chipper-shredder vacuum around the lawn to pick up debris.

Figure 2:
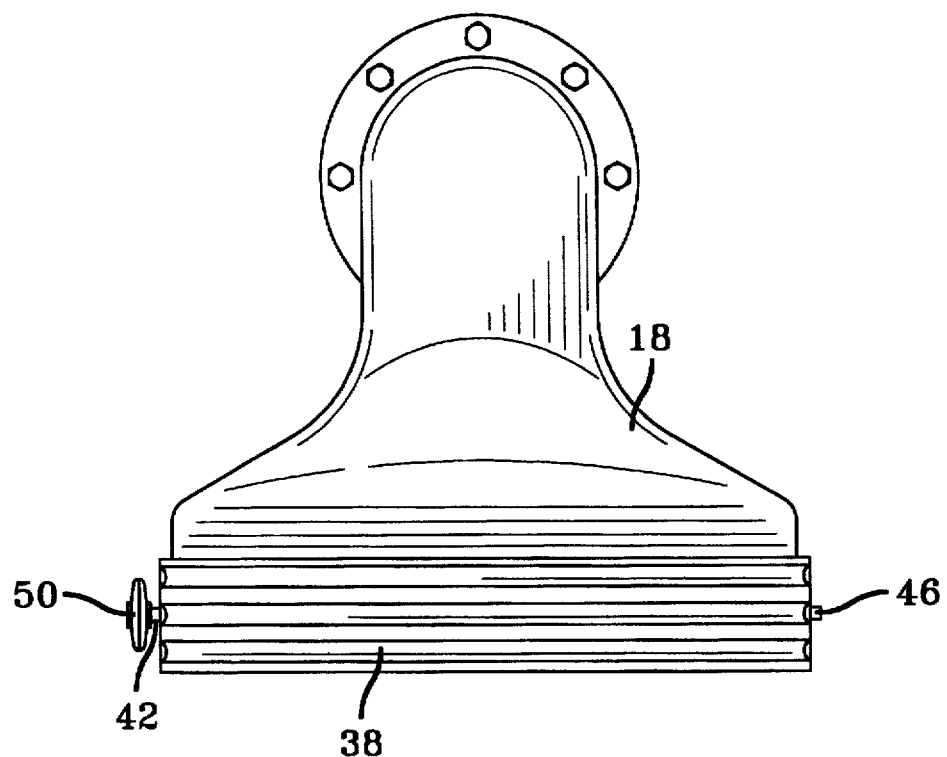
FIG. 2 is a front view of a nozzle and nozzle extension of the chipper-shredder vacuum of FIG. 1.
Figure 3:
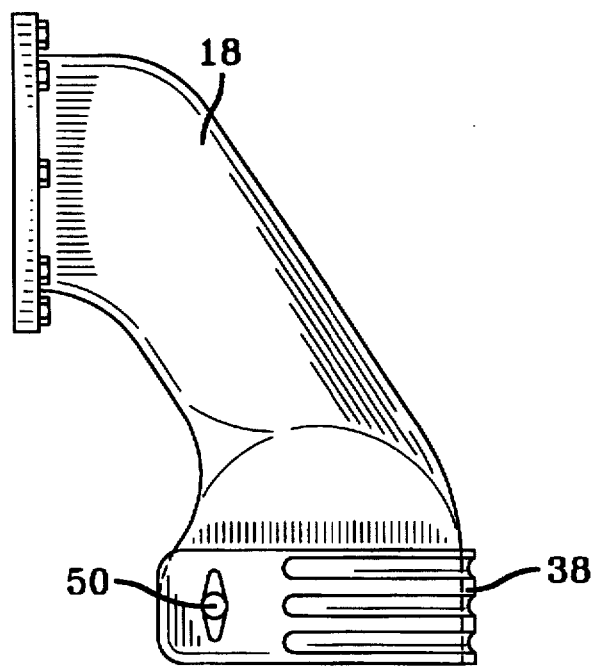
FIG. 3 is a side view of the nozzle and nozzle extension of FIG. 2.

FIG. 2 shows a front view and FIG. 3 shows a side view of one embodiment of the nozzle 18. A nozzle extension 38 extends below the bottom of the nozzle 18. The nozzle extension 38 is attached to the nozzle by bolts 42,46. The nozzle extension 38 is able to freely swing around the bolts 42,46. An adjustment nut 50 is operatively attached to bolt 42. Much like a wingnut, when adjustment nut 50 is tightened, the nozzle extension 38 is unable to rotate about the bolts 42,46. When the adjustment nut 50 is loosened, the nozzle extension is free to rotate about the bolts 42,46, thereby allowing the positioning and orientation of the nozzle extension to be adjusted.

Figure 4:
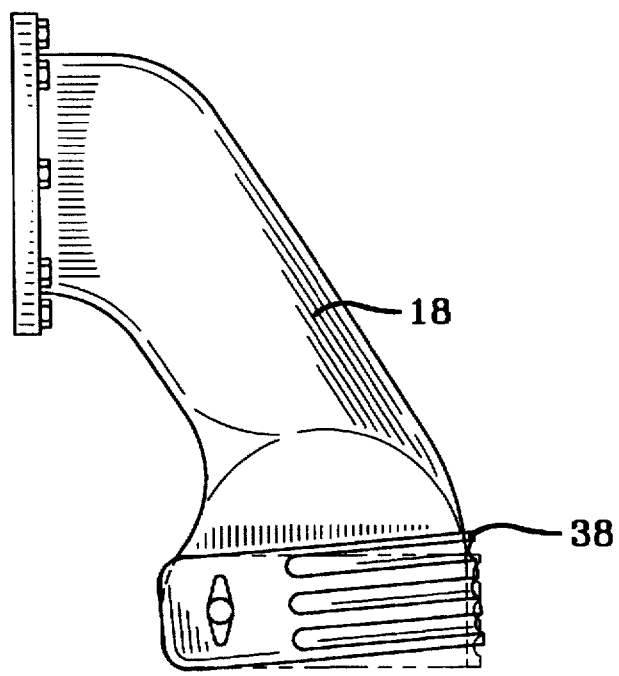
FIG. 4 is a side view of the nozzle extension adjusted for high clearance.

FIG. 4 shows the nozzle extension 38 adjusted for a high clearance. Raising the height of the nozzle extension 38 from the neutral position, represented by the dotted line, allows the chipper-shredder vacuum (not shown) to be used on bumpy terrain. Raising the height of the nozzle extension 38 prevents the nozzle extension and the chipper-shredder vacuum as a whole from being impeded by characteristic bumps of the terrain.

Figure 5:
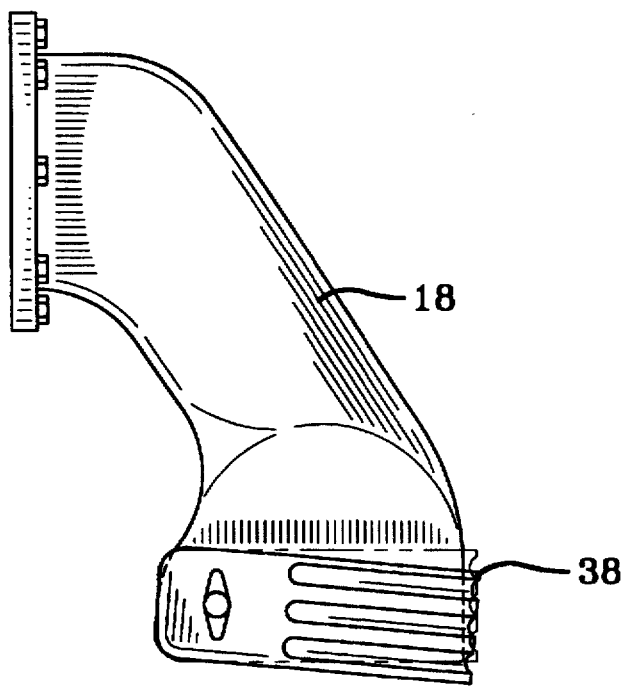
FIG. 5 is a side view of the nozzle extension adjusted for low clearance.

However, raising the height of the nozzle extension 38 lessens the force of the vacuum by allowing more air to enter the nozzle 18. Therefore, as shown in FIG. 5, the height of the nozzle extension 38 may also be lowered from the neutral position. Lowering the nozzle extension 38 is particularly useful when using the chipper-shredder vacuum (not shown) to clear pavement, sidewalks, or any other flat area of debris. Lowering the nozzle extension 38 limits the intake of air, and thus increases the force of the vacuum and efficiency of the chipper-shredder vacuum. The greater forward clearance created by raising the height of the nozzle extension 38 is not required on a flat surface.

Figure 6:
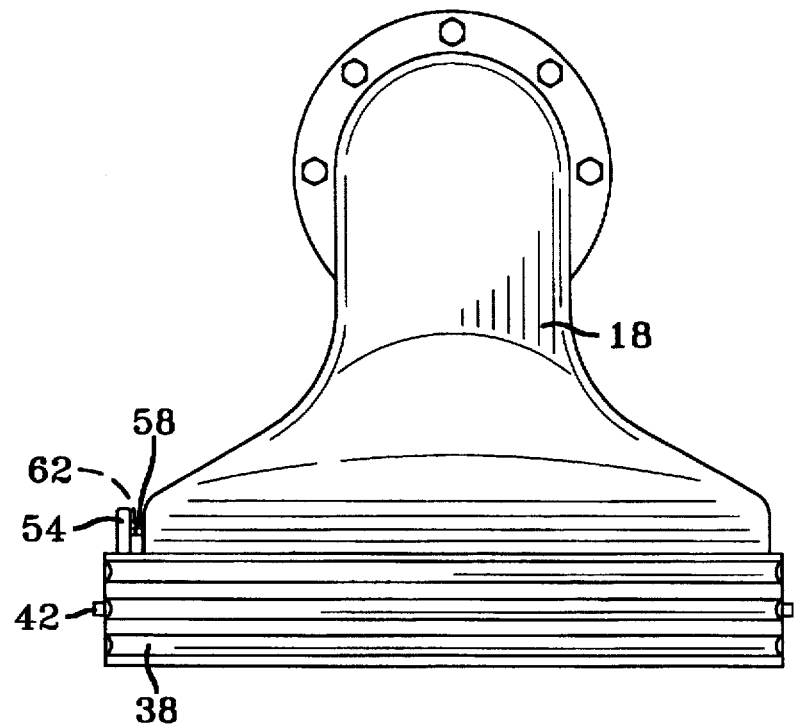
FIG. 6 is a front view of another embodiment of the nozzle and nozzle extension of the chipper-shredder vacuum of FIG. 1.
Figure 7:
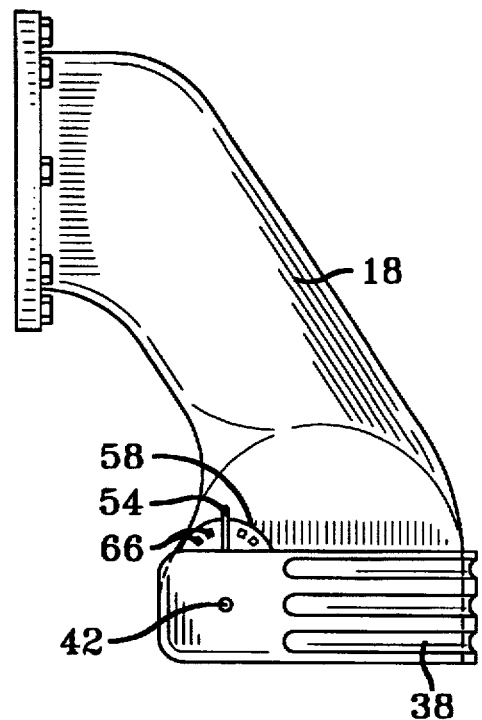
FIG. 7 is a side view of the nozzle and nozzle extension of FIG. 6.

FIG. 6 shows a front view and FIG. 7 shows a side view of another embodiment of the nozzle 18. A lever 54 is fixedly attached to bolt 42 between the nozzle extension 38 and the nozzle 18. The bolt 42 is preferably fixed to the nozzle extension 38. When the lever 54 is moved, the nozzle extension 38 rotates with the bolt 42. The lever 54 is engagable with an adjustment assembly 58. The lever 54 further has a contour 62 that fits over tabs 66 in the adjustment assembly 58. When the contour 62 is removed from one of the tabs 66, the nozzle extension 38 is free to rotate, and the height may be adjusted. When the contour 62 is engaged with one of the tabs 66, the lever 54, bolt 42, and nozzle extension 38 are prevented from moving because the adjustment assembly 58 is mounted to the nozzle 18. The lever 54, while preferably a rigid piece, is capable of slight lateral movement to engage and disengage the knob 62 with the slots 66.

Figure 8:
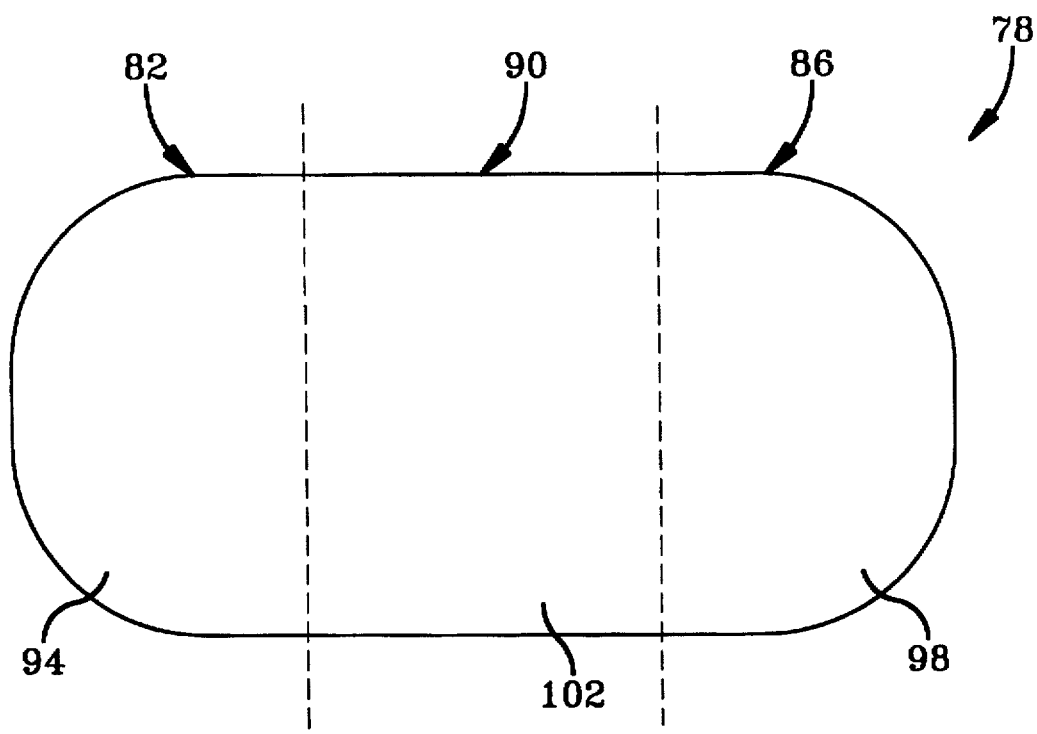
FIG. 8 is bottom view of a prior art nozzle intake.

FIG. 8 shows a view of the intake area 78 of a prior art nozzle 18 as viewed from the ground. The intake area 18 is divided by dotted lines into a first side section 82, a second side section 86, and a middle section 90, each consisting of a third of the cross sectional area of the intake area. The first side section 86 consists entirely of a first nozzle inlet 94 that provides vacuum force in the first side section. The second side section 86 is a second nozzle inlet 98 that provides vacuum force in the second side section. The middle section 90 is a middle nozzle inlet 102 that provides vacuum force in the middle section. In the nozzle 18 of the prior art, each of the nozzle inlets 94,98,102 are the same size as the nozzle section 82,86,90. The force of the vacuum in the middle nozzle inlet 102 is greater than the vacuum force in either the first nozzle inlet 94 or the second nozzle inlet 98 because the middle nozzle inlet has less contact with outside air that would reduce the vacuum pressure. The middle nozzle inlet 102 is bordered by both the first nozzle inlet 94 and the second nozzle inlet 98, whereas the first nozzle inlet and second nozzle inlet are only bordered by the middle nozzle inlet. The greater vacuum pressure in the middle section 90 creates an unequal pressure in the nozzle as a whole and limits the effectiveness of the apparatus to evenly vacuum a lawn.

Figure 9:
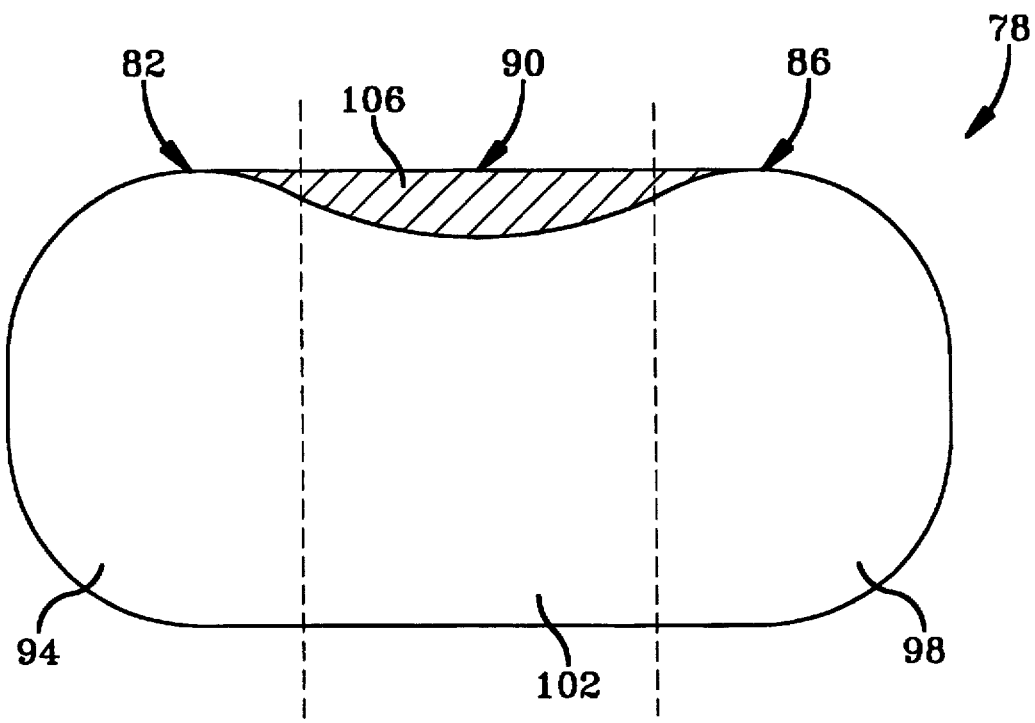
FIG. 9 is a bottom view of the nozzle intake according to the present invention.

FIG. 9 shows a view of the intake area 78 of the nozzle 18 of the present invention. A solid non-inlet area 106 is placed into the middle section 90 of the intake area 78. The non-inlet area 106 reduces the cross-sectional area of the middle nozzle inlet 102, thereby reducing the vacuum force in the middle section 90. The vacuum pressure in the middle section 90 may be equalized with the vacuum pressure in the first and second side sections 82,86. The cross-sectional area of the first and second nozzle inlets 94,98 are substantially equal, and both are larger than the middle nozzle inlet 102. While the nozzle intake area 78 of the present invention is described in connection with a chipper-shredder vacuum (not shown), it is conceivable that the intake area of the present invention could be applied to other machines and appliances that perform a vacuuming function, such as, but not limited to, vacuum cleaners.

The preferred embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

Having thus described the invention, it is now claimed:

1. A vacuum for vacuuming debris from an outdoor surface having a nozzle, an impeller assembly, and a bag, said nozzle comprising:

an inlet for directing debris into said nozzle, said inlet having a first side, a middle section, a second side, and a non-inlet area, said first side having a first nozzle inlet, said middle section having a middle nozzle inlet, said second side having a second nozzle inlet, said first nozzle inlet, said middle nozzle inlet, and said second nozzle inlet each having a cross-sectional area, said cross-sectional area of said first nozzle inlet being greater than said cross-sectional area of said middle nozzle inlet, said cross-sectional area of said second nozzle inlet being greater than said cross-sectional area of said middle nozzle inlet; and, an outlet, said outlet being connected to said impeller assembly.

2. The vacuum of claim 1 wherein said nozzle further comprises:

a nozzle extension extending below said nozzle, said nozzle extension being displaced a height from said outdoor surface; and, adjustment means for adjusting the height of said nozzle extension from said outdoor surface.

3. The vacuum of claim 2 wherein said adjustment means comprises:

a bolt, said bolt being threaded through a hole in said nozzle and a hole in said nozzle extension, said nozzle extension being rotatable about said bolt; and, an adjustment nut selectively engagable with said bolt, said adjustment nut fixedly securing said nozzle extension to said nozzle when said adjustment nut is tightened, said nozzle extension being rotatable when said adjustment nut is loosened.

4. The vacuum of claim 2 wherein said adjustment means comprises:

a bolt, said bolt being threaded through a hole in said nozzle and fixedly connected to said nozzle extension, said bolt being rotatable in said hole in said nozzle;

a lever fixedly connected to said bolt, said bolt rotating when said lever is moved;

a knob extending from said bolt; and, an adjustment assembly mounted to said nozzle, said adjustment assembly having a plurality of slots spaced apart, said knob of said lever being selectively engagable with each of said slots, said slots preventing rotation of said bolt in said hole in said nozzle when engaged with said knob of said lever, said height of said nozzle extension being adjusted when said knob of said lever is engaged with another of said slots.

5. A vacuum for vacuuming debris from an outdoor surface having a nozzle, an impeller assembly, and a bag, said nozzle comprising:

a nozzle extension extending below said nozzle, said nozzle extension being displaced a height from said outdoor surface; and, adjustment means for adjusting the height of said nozzle extension from said outdoor surface, said adjustment means comprising a bolt, said bolt being threaded through a hole in said nozzle and a hole in said nozzle extension, said nozzle extension being rotatable about said bolt, and an adjustment nut, said adjustment nut fixedly securing said nozzle extension to said nozzle when tightened, said nozzle extension being rotatable when said adjustment nut is loosened.

6. The vacuum of claim 5 wherein said adjustment means comprises:

a bolt, said bolt being threaded through a hole in said nozzle and fixedly connected to said nozzle extension, said bolt being rotatable in said hole in said nozzle;

a lever fixedly connected to said bolt, said bolt rotating when said lever is moved;

a knob extending from said bolt; and, an adjustment assembly mounted to said nozzle, said adjustment assembly having a plurality of slots spaced apart, said knob of said lever being selectively engagable with each of said slots, said slots preventing rotation of said bolt in said hole in said nozzle when engaged with said knob of said lever, said height of said nozzle extension being adjusted when said knob of said lever is engaged with another of said slots.

7. The vacuum of claim 5 wherein said nozzle further comprises:

an inlet for directing debris into said nozzle, said inlet having a first side, a middle section, a second side, and a non-inlet area, said first side having a first nozzle inlet, said middle section having a middle nozzle inlet, said second side having a second nozzle inlet, said first nozzle inlet, said middle nozzle inlet, and said second nozzle inlet each having a cross-sectional area, said cross-sectional area of said first nozzle inlet being greater than said cross-sectional area of said middle nozzle inlet, said cross-sectional area of said second nozzle inlet being greater than said cross-sectional area of said middle nozzle inlet; and, an outlet, said outlet being connected to said impeller assembly.

8. A nozzle inlet for use with a vacuum assembly, said nozzle inlet comprising:

a first side, said first side having a first nozzle inlet, said first nozzle inlet having a cross-sectional area;

a second side, said second side having a second nozzle inlet, said second nozzle inlet having a cross-sectional area;

a middle section located between said first side and said second side, said middle section having a middle nozzle inlet, said middle nozzle inlet having a cross-sectional area, said cross-sectional area of said first nozzle inlet being greater than said cross-sectional area of said middle nozzle inlet, said cross-sectional area of said second nozzle inlet being greater than said cross-sectional area of said middle nozzle inlet; and, a non-inlet area located in said middle section to reduce said cross-sectional area of said middle nozzle inlet.

9. The nozzle inlet of claim 8 wherein said cross-sectional area of said first nozzle inlet is substantially equal to said cross-sectional area of said second nozzle inlet.

* * * * *